UNITED STATES PATENT OFFICE.

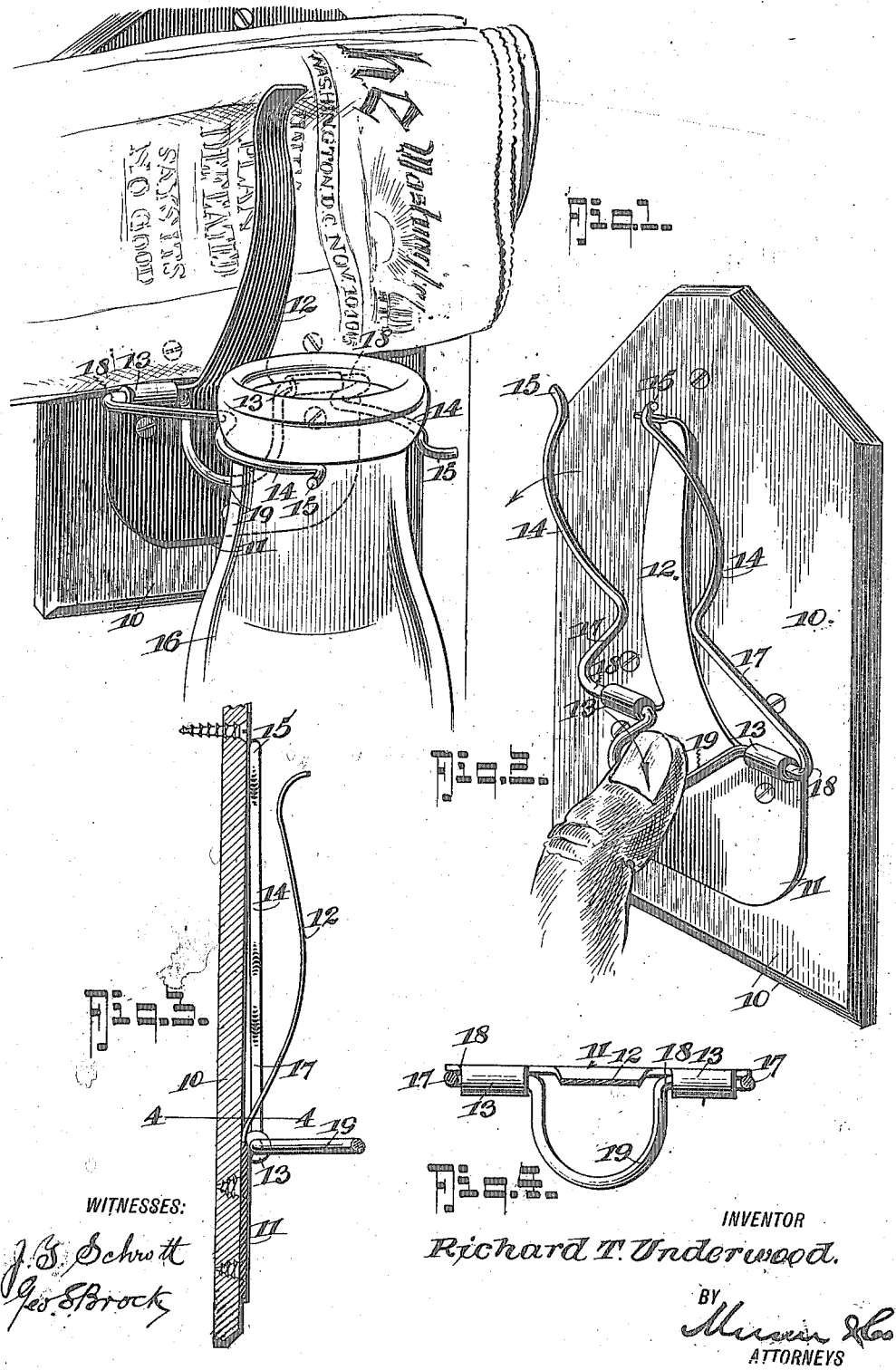

RICHARD T. UNDERWOOD, OF WASHINGTON, DISTRICT OF COLUMBIA.

MILK-BOTTLE HOLDER.

1,181,942. Specification of Letters Patent. Patented May 2, 1916.

Application filed November 11, 1915. Serial No. 60,904.

*To all whom it may concern:*

Be it known that I, RICHARD T. UNDERWOOD, a citizen of the United States, and a resident of Washington, in the District of Columbia, have made certain new and useful Improvements in Milk-Bottle Holders, of which the following is a specification.

My invention relates to improvements in milk bottle holders, and has for its main or principal object to provide a device of simple construction, and one which is easy to apply to the door-way of a house and which can be cheaply made and sold.

A further object is to provide a device of the character specified which will be sanitary and out of the reach of prowling marauders, such as cats, dogs, and the like.

With these and other objects in view, my invention consists in certain novel features of construction, arrangement and combination of parts, as will be hereinafter described and pointed out in the claim, reference being had to the accompanying drawing, in which:

Figure 1 is a perspective view of my device as in use. Fig. 2 is a similar view showing the device being put into use. Fig. 3 is a vertical section of the device ready for use. Fig. 4 is a horizontal section on line 4—4 of Fig. 3.

My improvement is designed to hold milk bottles on the framework of a door well up out of the way of children and others, and of such character that it will not catch on the clothing of persons going in or out of the door, and comprises preferably a base of wood or other material 10, fastened to the vertical side posts of a door-frame by screws or other suitable means; to this base near the lower end is secured a metal plate 11, which may have an integral resilient upstanding finger 12 suitably bent and forming a clip to retain a newspaper or milk tickets, etc.; at each side of the resilient finger 12 the upper edge of the plate is rolled to form hinge sockets 13 constituting part of a hinge for the bottle holder proper, which is made of a single piece of resilient wire bent to form the arms 14. These arms have their outer ends 15 bent outwardly to form an entrance for the neck of the bottle 16, which will be grasped and held by the arms, said arms curving inwardly and then outwardly in a straight line as at 17 for a suitable distance; they are then bent inwardly and horizontally toward each other, as at 18 and pivotally secured within the sockets 13 forming the pintles of the hinge, and are then bridged by a bail 19 clearly shown in Figs. 2 and 4, said bail member being disposed in a plane at right angles to the plane of the right arm aforesaid and forming a finger piece and stop in operating the holder; the horizontal portions or pintles 18 are held within the sockets 13 with sufficient friction to securely retain the arms in a vertical position and yet permit the said arms to be readily swung downwardly to a horizontal position, projecting away from the base. When swung up into a vertical position and not in use as a bottle holder, they will lie against the baseboard 10, and they may be then held against downward movement by a folded newspaper forced between them and the resilient finger 12, as shown in Fig. 1.

When it is desired to use the device as a bottle holder and no paper is in the clip, by placing the finger as illustrated in Fig. 2, or the bottom of the milk bottle, against the bail 19, and pressing downwardly thereon, the spring arms will be swung downwardly to a horizontal position and prevented from going farther than such horizontal position by the bail 19 contacting with the plate 11, and lying flat thereagainst and constituting a stop; the neck of the bottle can then be introduced between the arms 14 by a slight push and the neck of the bottle will then be tightly grasped by said arms and the bottle securely held in an upright position and will not be liable to be upset or knocked from the holder by movements at the sides. As the holder is to be placed well up and within the door-frame, the milk will be beyond the reach of small children and as the bottle will be capped by a hermetic closure the milk will be kept in a sanitary condition and out of the way of prowling marauders, such as cats, dogs and the like, and therefore free from contamination.

The bottle can be readily and quickly removed from the holder when desired, by grasping the bottle and giving it a gentle pull. The arms are then swung upwardly and against the baseboard, where they occupy a vertical position and are out of the way, and will not be likely to be caught on the clothing of persons going in or out of the door, and as the hinged and lower portions have no projecting ends the clothing cannot catch on these parts. The clip finger 12 can also be used when a bottle is in the holder and forms an additional guard against the arms being swung upward at that time.

If desired, the plate 11 can be secured directly to the door-frame and thus do away with the base-board 10, but this base-board forms a medium for advertising matter and may be used for that purpose, or to receive the name or card of the owner. Furthermore, the plate 11 which is of metal may have the name of the owner simply inscribed thereon, which is preferable to placing the name on the board 10, as by placing the name on the plate 11 it becomes a permanent name plate.

From the above it will be seen that my improved device is extremely neat, safe and sanitary, and as it can be manufactured quickly and cheaply, and hence sold at such a price that it will be within the reach of every home.

In addition to the foregoing it will be understood that when a bottle is secured in a holder such as herein shown, it is less likely to be stolen than if it were simply standing on the step, porch or the ground adjacent to the door, since the removal of the bottle involves a releasing of the same from the spring clasp forming the holder proper.

I claim:

A bottle support consisting of a single piece of resilient wire bent to form a pair of arms bent horizontally at their inner ends toward each other in the same plane and then outwardly in a plane at a right angle thereto, and a bridging member connecting the outwardly bent portions forming a finger piece and stop, a base on which said support is mounted, and means for hingedly connecting the support to the base.

RICHARD T. UNDERWOOD.

Witnesses:
JOHN L. FLETCHER,
MARGARET E. DILLER.